(12) United States Patent
Stevens et al.

(10) Patent No.: US 11,189,840 B2
(45) Date of Patent: Nov. 30, 2021

(54) COMPOSITE AIR ELECTRODE AND ASSOCIATED MANUFACTURING METHOD

(71) Applicants: ELECTRICITE DE FRANCE, Paris (FR); SOLVAY SA, Brussels (BE)

(72) Inventors: Philippe Stevens, Noisy Rudignon (FR); Gwenaelle Toussaint, Nemours (FR); Sophie Deshayes, Rampillon (FR); Silvia Rita Petricci, Bresso Milano (IT); Padmanabhan Srinivasan, Milan (IT)

(73) Assignees: ELECTRICITE DE FRANCE, Paris (FR); SOLVAY SA, Brussels (BE)

( * ) Notice: Subject to any disclaimer, the term of this patent is extended or adjusted under 35 U.S.C. 154(b) by 0 days.

(21) Appl. No.: 16/789,981

(22) Filed: Feb. 13, 2020

(65) Prior Publication Data
US 2020/0185727 A1 Jun. 11, 2020

Related U.S. Application Data

(62) Division of application No. 16/060,257, filed as application No. PCT/EP2016/080444 on Dec. 9, 2016, now abandoned.

(30) Foreign Application Priority Data

Dec. 11, 2015 (FR) ...................... 15 62243

(51) Int. Cl.
*H01M 4/86* (2006.01)
*H01M 4/24* (2006.01)
(Continued)

(52) U.S. Cl.
CPC ......... *H01M 4/8657* (2013.01); *H01M 4/244* (2013.01); *H01M 4/86* (2013.01);
(Continued)

(58) Field of Classification Search
CPC .... H01M 4/13–133; H01M 4/86; H01M 4/88; H01M 4/96; H01M 6/14–188; H01M 12/04–085
See application file for complete search history.

(56) References Cited

U.S. PATENT DOCUMENTS

| 3,553,024 A | 1/1971 | Fishman |
| 3,948,684 A | 4/1976 | Armstrong |

(Continued)

FOREIGN PATENT DOCUMENTS

| FR | 2 204 902 A1 | 5/1974 |
| FR | 2 945 292 A1 | 11/2010 |

(Continued)

OTHER PUBLICATIONS

Neburchilov et al., "A review on air cathodes for zinc-air fuel cells," Journal of Power Sources, 2010, vol. 195, pp. 1271-1291.
(Continued)

*Primary Examiner* — Jonathan Crepeau
*Assistant Examiner* — Jacob Buchanan
(74) *Attorney, Agent, or Firm* — Faegre Drinker Biddle & Reath LLP

(57) ABSTRACT

A method for manufacturing a composite electrode for a metal-air electrochemical cell with a liquid electrolyte of basic pH. A liquid solution comprising a fluoropolymer suspended in a solvent is synthesized, then deposited on the outer surface of a porous structure forming an air electrode. The fluoropolymer comprises $SO_2N$ groups suitable for conducting hydroxyl ions and is capable of forming a membrane impermeable to at least the liquid electrolyte of basic pH. When the liquid solution is applied to the porous structure, the solvent flows through the porous structure and the fluoropolymer is deposited by aggregating into a layer on the outer surface of the porous structure.

5 Claims, 5 Drawing Sheets

(51) Int. Cl.
*H01M 4/88* (2006.01)
*H01M 6/14* (2006.01)
*H01M 4/96* (2006.01)
*H01M 12/06* (2006.01)

(52) U.S. Cl.
CPC ......... *H01M 4/8605* (2013.01); *H01M 4/881* (2013.01); *H01M 4/96* (2013.01); *H01M 6/145* (2013.01); *H01M 12/06* (2013.01); *H01M 2004/8689* (2013.01)

(56) References Cited

U.S. PATENT DOCUMENTS

| | | |
|---|---|---|
| 4,407,907 A | 10/1983 | Takamura et al. |
| 4,975,172 A | 12/1990 | Yeager et al. |
| 5,242,765 A | 9/1993 | Naimer et al. |
| 9,136,550 B2 | 9/2015 | Stevens et al. |
| 2003/0194599 A1 | 10/2003 | Sassa et al. |
| 2004/0166416 A1 | 8/2004 | Randell et al. |
| 2006/0177717 A1 | 8/2006 | Teasley et al. |
| 2012/0058413 A1 | 3/2012 | Stevens et al. |
| 2012/0141888 A1 | 6/2012 | Bulan et al. |
| 2016/0087320 A1* | 3/2016 | Suyama ................ H01M 12/06 429/405 |

FOREIGN PATENT DOCUMENTS

| | | | |
|---|---|---|---|
| JP | H09-102322 A | 4/1997 | |
| JP | 2005-507543 A | 3/2005 | |
| JP | 2007-528843 A | 10/2007 | |
| WO | 2012/098146 A1 | 7/2012 | |
| WO | WO-2015066630 A1 * | 5/2015 | .......... H01M 12/085 |

OTHER PUBLICATIONS

Office Action issued in related application JP 2018-530095, dated Dec. 17, 2018, with English language translation, 6 pages.

* cited by examiner

COMPOSITE AIR ELECTRODE AND ASSOCIATED MANUFACTURING METHOD

CROSS-REFERENCE TO RELATED APPLICATIONS

This application is a divisional of U.S. patent application Ser. No. 16/060,257, filed Jun. 7, 2018, which is the U.S. national phase of the International Patent Application No. PCT/EP2016/080444 filed Dec. 9, 2016, which claims the benefit of French Application No. 15 62243 filed Dec. 11, 2015, the contents being incorporated herein by reference.

FIELD

The disclosure relates to the field of protecting the air electrode of a metal-air electrochemical cell against the corrosive effects of a liquid electrolyte of basic pH. It may have applications in zinc-air batteries.

BACKGROUND

Electrochemical cells are generally composed of a negative electrode, a positive electrode, and an electrolyte for the transit of charge carriers from one electrode to the other.

Metal-air electrochemical cells generally comprise a liquid electrolyte. The negative electrode, typically formed from a metal compound M, decomposes into $M^{n+}$ ions during discharge while oxygen from the air is reduced at the positive electrode, called the air electrode, in the following reactions:

Discharge at the negative electrode: $M \rightarrow M^{n+} + ne^-$

Discharge at the positive electrode: $O_2 + 2H_2O + 4e^- \rightarrow 4OH^-$

One of the advantages of metal-air systems is the use of a positive electrode, also called an air electrode, of infinite capacity. The oxygen consumed at the positive electrode does not need to be stored in the electrode but can be taken from the surrounding air. Metal-air electrochemical generators are thus known for their high specific energy, which can reach several hundreds of Wh/kg.

Air electrodes are used for example in alkaline fuel cells, which are particularly advantageous compared to other systems because of the high reaction kinetics at the electrodes and the absence of noble metals such as platinum.

Other metal-air cells are based on the use of a non-alkali metal such as zinc in the negative metal electrode. A zinc electrode is stable in an alkaline electrolyte. Metal-air batteries, particularly zinc-air batteries, are found for example in hearing aids.

An air electrode is a porous solid structure, usually of carbon grains, in contact with the liquid electrolyte. The interface between the air electrode and the liquid electrolyte is a "triple contact" interface where the active solid material of the electrode, the gaseous oxidant, meaning oxygen from the air, and the liquid electrolyte are present simultaneously. A description of the different types of air electrodes for zinc-air batteries is provided for example by Neburchilov V. et al, in the article entitled "A review on air cathodes for zinc-air fuel cells", *Journal of Power Sources* 195 (2010) p. 1271-1291.

The triple contact interface of an air electrode presents several technical challenges. In particular, air electrodes degrade quickly, even when not in operation, in particular because of the corrosive effect of the liquid electrolyte of basic pH of the electrochemical cells. However, despite this corrosive effect, it is desirable to increase the concentration of the basic compound of the electrolyte (potassium hydroxide, sodium hydroxide, lithium hydroxide, etc.) to achieve even higher performance of the metal-air cell.

Furthermore, the liquid electrolyte can dissolve the constituent catalyst of the air electrode. The cations from the dissolved catalyst may contribute to degrading the performance of a metal-air cell, by facilitating an undesirable water reduction reaction likely to interfere with the deposition of metal on the negative electrode, reduce the Coulomb and energy efficiency, and consume the water.

Indeed, in a zinc-air battery, metal zinc is deposited by electrochemical reduction on the negative electrode of the battery, from an aqueous solution of zincate ions. It turns out that the theoretical reduction potential of zincate ion to metal zinc is less negative than the theoretical reduction potential of water to hydrogen. Both reactions can coexist at the negative electrode:

$2H_2O + 2e^- \leftrightarrow H_2 + 2OH^-$ $E°$ N=−0.8277

$Zn(OH)_4^{2-} + 2e^- \leftrightarrow Zn + 4OH^-$ $E°/V$=−1.199

An overvoltage at the zinc negative electrode facilitates the zincate reduction reaction over the water reduction, but is insufficient to prevent the water reduction, particularly in the presence of ion impurities from a deteriorated air electrode.

At the same time, the reduction of oxygen in an aqueous medium can occur according to several reactions:

$O_2 + 2H_2O + 4e^- \rightarrow 4OH^-_{(aq)}$ reduction to 4 electrons $O_2 + H_2O + 2e^- \rightarrow HO_2^- + OH^-_{(aq)}$ reduction to 2 electrons $HO_2^- + H_2O + 2e^- \rightarrow 3OH^-$ $2HO_2^- \rightarrow 2OH^- + O_2$ disproportionation reaction The reduction to two electrons produces peroxide intermediate. However, peroxide is known to degrade the polymer electrolytes likely to be used in a fuel cell.

In addition to the corrosive effect of the basic compound of the liquid electrolyte, the simple progressive wetting of the porous structure of an air electrode until it is flooded eventually renders such an electrode inoperative. This wetting is aggravated during charging and discharging phases of the cell.

Furthermore, the carbon dioxide present in air diffuses into the concentrated basic solution and is converted into carbonate anion, which precipitates in the presence of cations. The low solubility of the formed carbonates leads to progressive carbonatation of the electrolyte.

These carbonates form primarily at the gas-liquid interface in the air electrode pores, and are known for significantly facilitating the flooding phenomenon. In addition, the precipitation of carbonates in the pores of the air electrode gradually destroys the air electrode and renders it inoperative.

Because of these negative effects—flooding of the air electrode by the electrolyte, carbonatation by $CO_2$ dissolution in the electrolyte, catalyst degradation by the electrolyte, corrosion of the electrode by the electrolyte, all associated with the use of a basic electrolyte—a solution is desired which protects an air electrode from this basic electrolyte.

Document FR0953021 proposes protecting an air electrode of a metal-air battery by using an interpenetrating polymer network (IPN) or a semi-interpenetrating polymer network (semi-IPN). Uncured network is deposited on the air electrode and then solidified in situ by polymerization. The semi-IPN or IPN network is attached by anchoring the polymer in the pores of the air electrode over a thickness typically corresponding to 2% of the thickness of the electrode. Although these networks form a membrane to protect the electrode from the liquid electrolyte, the method of in situ manufacturing and anchoring in the air electrode pores can be further optimized. In addition, it has been noted that a membrane of IPN or non-fluorinated semi-IPN is not impermeable to highly concentrated basic electrolytes, and degrades in an electrolyte comprising a hydroxyl ion concentration of around 8 mol/L or higher.

SUMMARY

In response to the problems described above, the present disclosure provides a method for manufacturing a composite electrode intended for use in a metal-air electrochemical cell with a liquid electrolyte of basic pH, the method comprising:
  obtaining a porous structure comprising an outer surface, the porous structure being configured to facilitate an oxygen reduction reaction into hydroxyl ions in the presence of an electric current;
  synthesizing a first liquid solution comprising a fluoropolymer suspended in a solvent, the fluoropolymer being capable of conducting hydroxyl ions and of forming a membrane that is impermeable to at least the liquid electrolyte of basic pH;
  applying the first liquid solution at least once onto the outer surface of the porous structure, the solvent flowing through the porous structure and the fluoropolymer being deposited by aggregating into a layer on the outer surface of the porous structure, thereby forming said impermeable membrane of the porous structure conductive to hydroxyl ions, said membrane being impermeable to at least the liquid electrolyte of basic pH.

The disclosure relies on a method which does not perform in situ polymerization in order to form a protective membrane on the air electrode of a metal-air cell. The method also does not require anchoring the polymer in the pores of an air electrode. This reduces the thickness of the polymer membrane deposited on the surface, without impacting its impermeability. Indeed, as the fluoropolymer is already polymerized, in the form of a suspension in the first liquid solution, it does not penetrate, or barely penetrates, the pores of the air electrode and advantageously remains trapped on the outer surface of the latter, while the solvent of the first liquid solution flows through the pores of the air electrode. The polymer trapped on the outer surface of the air electrode will naturally aggregate to form a thin protective layer which is impermeable to a basic liquid electrolyte. The choice of fluoropolymer to obtain the desired effect of hydroxyl ion conduction and impermeability can concern compositions such as those described in WO2012/098146.

Furthermore, the method allows depositing a thinner polymer layer than methods of the prior art, without losing impermeability to the liquid electrolyte. Typically, the thickness of a protective layer for the electrode has a thickness chosen as a compromise between acting as a barrier to the liquid electrolyte and good conductance. A protective layer according to the prior art is typically with a sufficient thickness to avoid holes and to form an effective barrier against the liquid electrolyte, although this is at the expense of conductance. The resistivity of a protective layer increases with thickness. The method facilitates obtaining a hole-free layer of low thickness, thus forming an impermeable barrier to the liquid electrolyte without increasing the resistivity of the protective layer in comparison to methods of the prior art.

By forming such an impermeable membrane, the air electrode is no longer directly exposed to the corrosive basic medium of the liquid electrolyte. Thus, the phenomena of flooding the air electrode and dissolution of the air electrode catalyst can be avoided.

Another effect of this deposition of a layer is a reduction of the carbonatation phenomenon in the composite electrode. It seems that the presence of a fluoropolymer layer on the outer surface of the air electrode contributes to slowing the release of $CO_2$ in the electrode. This also helps extend the service life of the composite electrode in comparison to electrodes of the prior art.

The method may further comprise:
  applying the first liquid solution a second time onto the outer surface of the porous structure,
  evaporating the solvent of the first liquid solution applied a second time onto the outer surface of the porous structure.

The implementation of a composite electrode according to the method described above can be performed by a single application of the first liquid solution, with no solvent evaporation step. When the method for forming the composite electrode involves only a single application of the first liquid solution, the solvent can flow through the pores of the air electrode. However, when the first liquid solution is applied multiple times onto the air electrode, typically two or three times, it may be advantageous to add a solvent evaporation step. The solvent can no longer flow naturally through the air electrode pores, when access to these pores is blocked by the previously applied polymer layer.

According to one embodiment, the method further comprises, during the obtaining of the porous structure:
  incorporating fluoropolymer capable of conducting hydroxyl ions and of forming a membrane impermeable to at least the liquid electrolyte of basic pH, into a carbon powder used to prepare the porous structure,
  obtaining the porous structure from the carbon powder mixed with the fluoropolymer.

According to this advantageous embodiment, the porous structure of the air electrode comprises the polymer conductive to hydroxyl ions that is impermeable to the liquid electrolyte, distributed in the volume of the air electrode, preferably uniformly. The porous structure of the composite electrode thus obtained is effectively protected against any basic electrolyte which successfully crosses the membrane covering the outer surface of the air electrode. Furthermore, this embodiment also can significantly reduce the carbonatation phenomenon in the composite electrode. By incorporating the fluoropolymer into the electrode structure, the reduction of the carbonatation phenomenon is even more pronounced.

The electrode may be intended for a metal-air battery as a positive electrode, the pH of the liquid electrolyte being about 14 or higher.

In particular, it has been observed that the polymer membrane obtained by the method described above forms an effective seal against highly concentrated basic electrolytes having a pH greater than 14 and which typically can reach hydroxyl ion concentrations of around 8 mol/L or higher.

The disclosure also relates to a composite electrode intended for use in a metal-air electrochemical cell with a liquid electrolyte of basic pH, the composite electrode comprising:

a porous structure comprising an outer surface, the porous structure being configured to facilitate an oxygen reduction reaction into hydroxyl ions in the presence of an electric current;

an impermeable membrane of fluoropolymer, conductive to hydroxyl ions, impermeable to the liquid electrolyte of basic pH, the protective membrane being arranged on the outer surface of the porous structure in the form of a layer, the fluoropolymer having a polymerized structure adapted to prevent penetration of said fluoropolymer into the porous structure.

According to one embodiment, the fluoropolymer of the composite electrode comprises $SO_2N$ groups facilitating the conduction of hydroxyl ions through the membrane.

In particular, the $SO_2N$ group may be part of a $SO_2NRQ^+$ group where:

$Q^+$ is a group comprising at least one quaternary nitrogen atom,

R is selected from the group consisting of: hydrogen, an alkyl of the $C_1$-$C_{20}$ group, a cyclic compound comprising the Q+ group and between 2 and 20 carbon atoms, a cyclic compound comprising the Q+ group, between 2 and 20 carbon atoms, and up to 4 heteroatoms.

The fluoropolymer described above may correspond to or comprise a compound such as the one described in document WO2012/098146.

According to one embodiment, the fluoropolymer comprises a fluorinated backbone chain with polar groups that are at least partially hydrogenated.

Surprisingly, it has been noted that a fluoropolymer comprising a fluorinated backbone and at least partially hydrogenated polar groups has the property of naturally forming thin layers by the method described above. According to one possible explanation of this phenomenon, provided as an illustrative and non-limiting example, it seems that the at least partially hydrogenated polar groups of the polymer contribute both to binding the polymer aggregates together after application onto the outer surface of the air electrode, and binding themselves to the outer surface of the air electrode without significantly penetrating into the pores of the surface.

According to one embodiment, the fluoropolymer further comprises at least one quaternary ammonium group with no hydrogen in the beta position.

It has been noted that by ensuring replacement of the beta-position hydrogen of a quaternary ammonium group of the fluoropolymer, a particularly high stability to strongly basic electrolytes can be obtained.

According to one embodiment, the fluoropolymer comprises groups belonging to the family of tetrafluoroethylene and sulfur groups.

Advantageously, the thickness of the protective membrane can be between 10 μm and 100 μm.

Such a thickness allows obtaining a composite electrode of which the protective polymer membrane is simultaneously sufficiently impermeable to a basic electrolyte, has sufficient mechanical strength at the membrane, and sufficiently conducts hydroxyl ions across the membrane. Good mechanical strength combined with good ion conduction gives satisfactory electrical performance to an electrochemical cell equipped with a composite electrode.

According to one embodiment, the porous structure comprises a polymer-based material optimizing the conduction of hydroxyl ions.

In particular, the polymer-based material of the porous structure can form an interpenetrating polymer network or a semi-interpenetrating polymer network.

By combining the hydroxyl ion conduction properties of the polymer membrane with an optimized conduction of hydroxyl ions by the porous structure of the air electrode, the hydroxyl ions can move more easily from the electrolyte to the porous structure and occupy as much of the volume of the air electrode as possible. It is thus possible to obtain an air electrode providing particularly efficient oxygen reduction, exploiting the full volume of the electrode.

The disclosure also relates to a metal-air battery comprising a composite electrode as described above.

The battery may further comprise a metal negative electrode of zinc and a liquid electrolyte of a basic pH of about 14 or higher.

BRIEF DESCRIPTION OF THE DRAWINGS

The method that is the object of the disclosure will be better understood from reading the following description of some exemplary embodiments presented for illustrative purposes and in no way limiting, and studying the following drawings in which.

For clarity, the dimensions of the various elements represented in these figures are not necessarily in proportion to their actual dimensions. In the figures, identical references correspond to identical elements.

DETAILED DESCRIPTION

Figure 1:
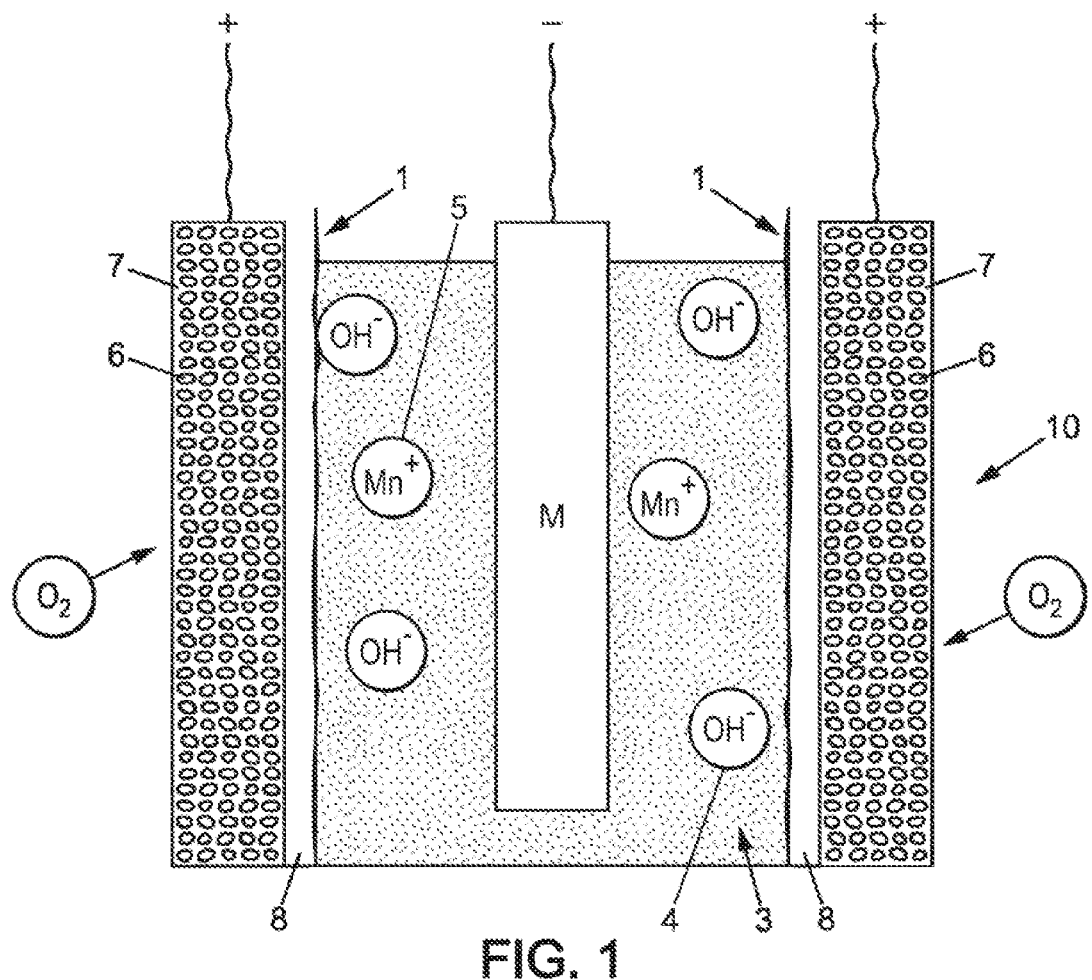
FIG. 1 is a schematic representation of a metal-air electrochemical cell comprising a composite electrode according to an embodiment.

The disclosure relates to a method for protecting an air electrode from the negative effects of a liquid electrolyte of basic pH. FIG. 1 shows a metal-air electrochemical cell 10 comprising a composite electrode which is an object of the present disclosure, obtainable by the method presented below. The cell represented in FIG. 1 may be an integral part of a metal-air battery comprising a plurality of electrochemical cells. It is also possible for a battery to comprise only one cell.

As shown in FIG. 1, the electrochemical cell 10 comprises two composite electrodes 1, corresponding to air electrodes having a porous structure 7. The porous structure 7 of an air electrode of an electrochemical cell can be obtained from carbon grains 6 joined by a binder. The space between the carbon grains 6 allows air and in particular oxygen contained in the air to flow through the porous structure 7 to a triple interface of air/electrode/$OH^-$ ions. This triple interface is the site of oxidation reactions.

The porous structure 7 comprises, on an outer surface facing a liquid electrolyte, a membrane 8 impermeable to the liquid electrolyte 3 of basic pH. The liquid electrolyte may advantageously contain a low concentration of $H^+$ ions and have a pH of about 14 or higher. In particular, high pH values can be expressed in concentrations of $OH^-$ ions. In the context of metal-air electrochemical cells, a high concentration of $OH^-$ ions can offer better electrical performance by allowing a larger number of $OH^-$ ions to reach the reaction site at the triple interface of the porous structure. The membrane 8 covering the outer surface of the porous structure 7 of the composite electrode 1 in FIG. 1, facing the liquid electrolyte, protects the porous structure from the liquid electrolyte even when the concentration of $OH^-$ ions is about 8 mol/L or higher.

The liquid electrolyte 3 typically comprises a high concentration of $OH^-$ ions, also known as hydroxyl ions 4, and also comprises $M^{n+}$ metal ions 5, as shown in FIG. 1. The $OH^-$ ions can freely pass through the membrane 8. However, the membrane 8 is impermeable to the other species present in the electrolyte 3 and in particular can advantageously prevent direct contact of the electrolytic liquid with the porous structure 7. Thus, the flooding phenomenon observed in air electrodes can be avoided as can the corrosive effect of the electrolyte 3 on the porous structure 7.

Figure 2A:
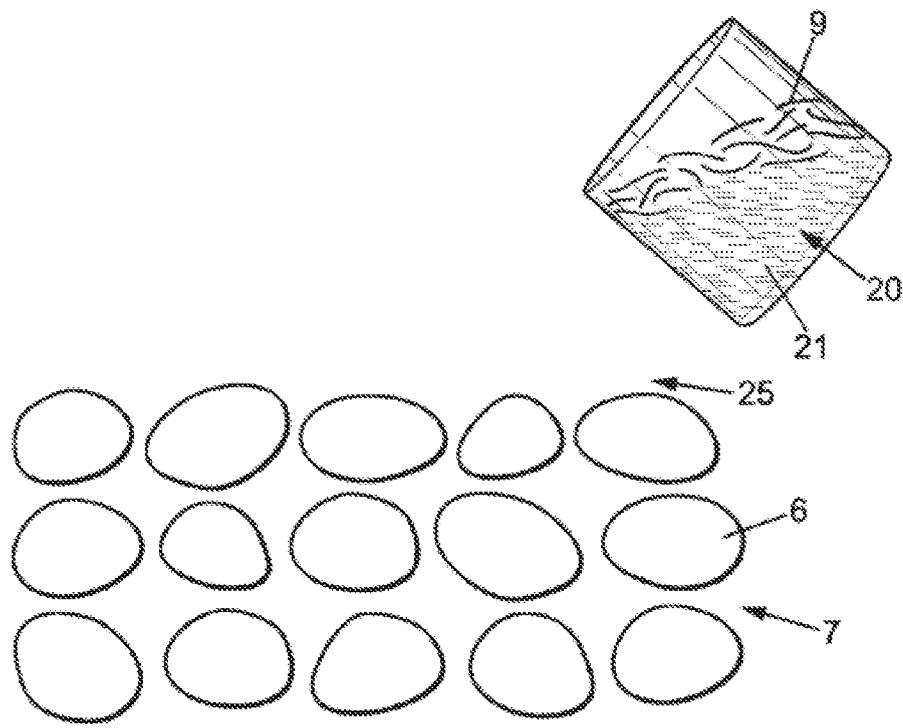
FIGS. 2*a* and 2*b* are schematic representations of the application of a first liquid solution comprising a fluoropolymer capable of forming a layer impermeable to a liquid electrolyte of basic pH, onto a porous structure.
Figure 2B:
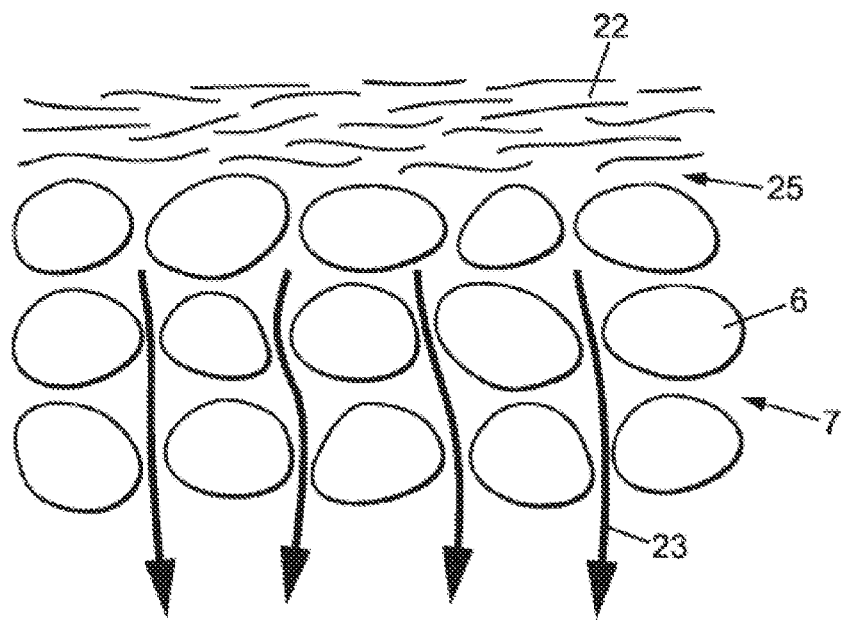

The membrane 8 is composed of a fluoropolymer deposited on the outer surface of the porous structure 7. FIGS. 2a and 2b schematically represent the deposition of the polymer as a layer 22. This layer 22 is formed on the outer surface 25 of the porous structure 7 without having to penetrate inside the pores.

As shown schematically in FIG. 2a, a first liquid solution 20 is prepared. This liquid solution comprises a fluoropolymer 9 suspended in a solvent 21. Although shown in FIG. 2a as being suspended on the surface of the first liquid solution 20, it is also possible for the fluoropolymer to be uniformly distributed in the solvent 21 while being in suspension. The fluoropolymer 9 shown in FIG. 2a is composed of molecules in the form of long polymer chains. The representation as fibers in FIGS. 2a and 2b illustrates the fact that the fluoropolymer 9 is present in the solvent 21 in polymerized form. However, at this stage these polymer chains do not yet form an assembled semi-rigid ensemble.

By applying the first fluid solution 21 onto the outer surface 25 of the porous structure 7, the solvent 21 flows through the pores of the porous structure 7 between the carbon grains 6, for example following paths 23 as shown in FIG. 2b. The molecules of elongate structure of the fluoropolymer 9 penetrate the porous structure 7 with difficulty. As shown in FIG. 2b, the fluoropolymer 9 is retained on the outer surface 25 of the porous structure. This retention on the outer surface without penetrating the pores of the air electrode is related to the length of the fluoropolymer chains 9, already polymerized at the time of application of the liquid solution onto the porous structure, and is related to the composition of the porous structure 7 itself. Indeed, the porous structures 7 used in metal-air electrochemical cells generally comprise polytetrafluoroethylene (PTFE). It has been noted that PTFE seems to have a repellent effect on the fluoropolymer 9, facilitating its retention on the outer surface 25 of an air electrode.

Deposition of the first fluid solution 20 onto the outer surface 25 of the porous structure 7 may for example be done by painting, transfer, and may involve the use of a scraper to spread the polymer.

When the first fluid solution 20 is applied onto the porous structure 7, the solvent 21 flows through the porous structure while the polymer chains of the fluoropolymer 9 are filtered and retained on the outer surface 25 of the porous structure.

Due to this filtering, the molecules of the fluoropolymer are no longer dispersed in the solvent and their clumping on the outer surface 25 of the porous structure facilitates their aggregation to form an impermeable structure in the form of a layer 22.

The process of consolidation of the layer 22 can occur without outside intervention once the fluoropolymer 9 is deposited on the porous structure 7. Aggregation of the polymer chains to form the layer 22 may be accelerated, however, by exposing the structure of FIG. 2b to a temperature higher than room temperature.

It is generally accepted that obtaining a stable and resistant membrane requires a particular mechanism for anchoring the membrane to the air electrode. The disclosed method, which provides no particular mechanism for anchoring the fluoropolymer 9 in the pores of the porous structure 7, and which applies to an air electrode an already polymerized fluoropolymer in suspension in a solvent, provides a novel and counter-intuitive solution to the problem of protecting an air electrode.

One possible explanation for the stability of the contact between the layer 22 and the outer surface of the porous structure, provided here for illustrative purposes and non-limiting, could be attributed to adhesion of the fluoropolymer 9 to the outer surface 25 of the porous structure. Indeed, due to its porous structure, the air electrode has an outer surface having numerous irregularities which increase the surface area of this surface. Low forces of adhesion, such as Van der Waals forces, can provide sufficient attraction to maintain the layer 22 in a fixed position in contact with the porous structure 7.

Moreover, it appears that the carboxyl groups typically contained in the grains 6 of the porous structure 7 of an air electrode also contribute to maintaining the fluoropolymer in contact with the outer surface 25.

The method for depositing the fluoropolymer 9 on the outer surface of the porous structure 7 can be performed all at once as schematically illustrated in FIGS. 2a and 2b. However, it may also be carried out in multiple applications, typically two or three, to obtain a greater thickness of the membrane 8.

Particularly satisfactory properties of protection against a liquid electrolyte 3 of basic pH, with hydroxyl ion concentrations 4 of about 8 mol/L or higher, have been observed for membrane 8 thicknesses between 10 µm and 100 µm. Such a thickness range makes it possible to ensure sufficient impermeability to the strongly basic liquid electrolyte 3, as well as effective conduction of hydroxyl ions 4 through the membrane 8 and sufficient mechanical strength of the membrane. It should be noted that the method for forming a membrane 8 has the advantage of facilitating the formation of an impermeable layer of low thickness, without holes. Thus, the obtained membrane 8 forms an effective barrier to the liquid electrolyte while offering a conductance which is not reduced by the thickness of the membrane. Indeed, as mentioned above, membrane resistivity increases with thickness. A reduction in the thickness therefore contributes to increasing the conductance.

When the step of depositing the fluoropolymer 9 on the outer surface 25 of the porous structure 7 is performed multiple times, it may be that the solvent 21 cannot entirely flow through the pores of the porous structure 7. More particularly, the solvent will have difficulty flowing through the porous structure when a layer 22 of polymer already covers the outer surface of the air electrode. To overcome this difficulty in eliminating excess solvent 21, an additional step of solvent 21 evaporation can be implemented after a first application of the first liquid solution. This evaporation may be achieved by heating the solvent, for example at temperatures between room temperature and 100° C., preferably a temperature of 80° C.

Figure 3:
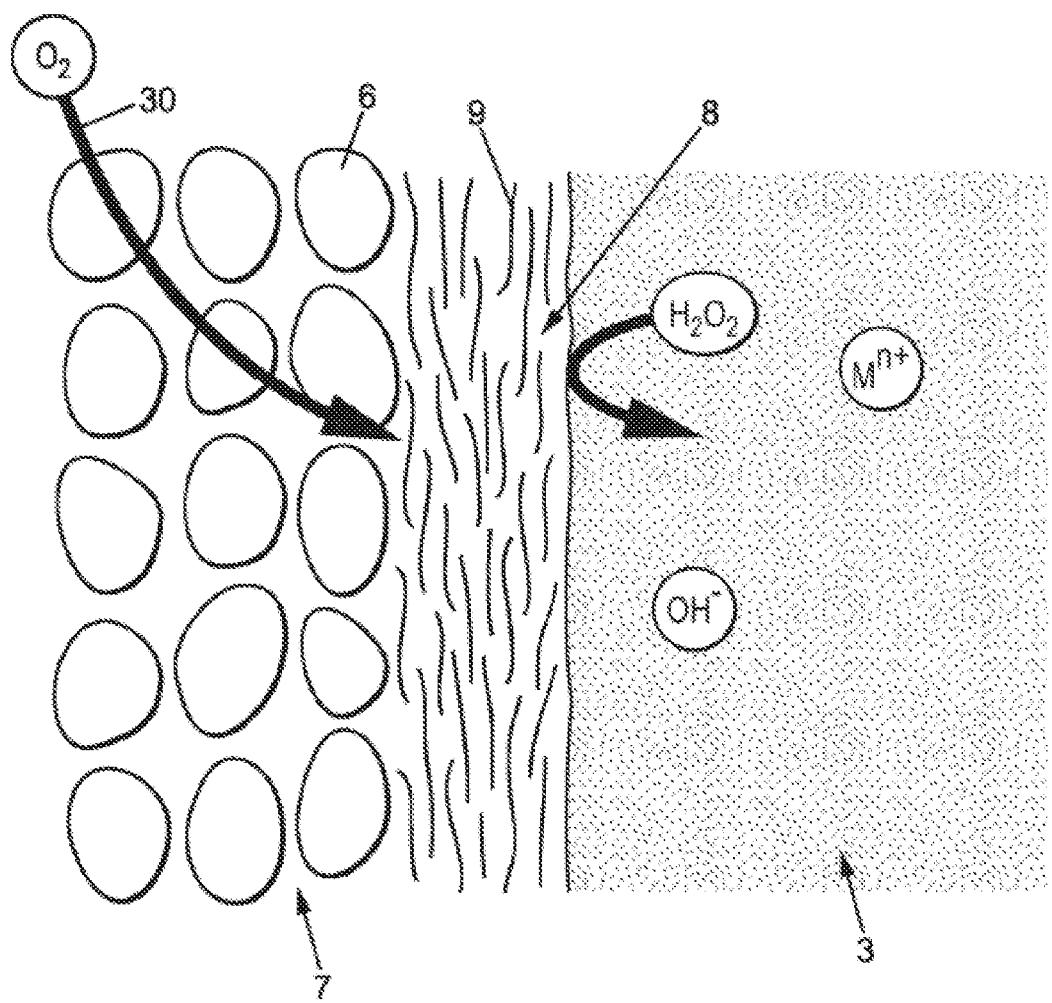
FIG. 3 is a schematic representation of a composite electrode according to a first embodiment in a liquid electrolyte of high basic pH, illustrating the conductive and barrier properties of the electrode in discharge phase.

The electrode composite which is the object of the disclosure can advantageously perform several functions to enhance the performance and useful life of an air electrode of a metal-air battery. FIG. 3 schematically shows a portion of a composite electrode of a metal-air cell. The porous structure 7 comprises on its outer surface a membrane 8 of fluoropolymer 9, aggregated into a layer impermeable to the liquid electrolyte 3. However, although the liquid electrolyte 3 is blocked by the membrane 8 and does not come into contact with the porous structure 7, the hydroxyl ions $OH^-$ can pass through the membrane 8.

In addition to the fact that the fluoropolymer, present as a layer on the outer surface of the porous structure, forms a barrier to the liquid electrolyte having a high concentration of hydroxyl ions, it was found that this layer also reduces the carbonatation phenomenon in the composite electrode by preventing direct contact between the $CO_2$ from the air and the liquid electrolyte. Although the fluoropolymer does not appear to have the intrinsic property of total impermeability to carbon dioxide, its use in combination with the porous structure of the air electrode appears to result in slowing down the carbon dioxide diffusion phenomenon in the composite electrode. Without being tied to a particular theory, and as a non-limiting and purely illustrative example, one possible explanation for this observation could be a competition between the diffusion of ions in the fluoropolymer and the diffusion of carbon dioxide. When the hydroxyl ions diffuse into the fluoropolymer, it is possible that the carbon dioxide has more difficulty in simultaneously crossing the fluoropolymer layer, which creates a synergistic effect between ion conduction and reduction of the carbonatation phenomenon. In addition, the slowed carbonatation of the liquid electrolyte, observed in the presence of a layer of fluoropolymer, could be attributed to the presence of the solid barrier constituted by this layer on the electrode.

The fluoropolymer is chosen so as to possess such multiple properties combining impermeability to a liquid electrolyte 3 and conduction of hydroxyl ions. In the family of fluoropolymers, it has been noted that polymers comprising $SO_2N$ groups have hydroxyl ion conduction properties enabling metal-air batteries to provide satisfactory electrical performance. In particular, the association of $SO_2N$ groups with a $Q^+$ group comprising at least one quaternary nitrogen atom, and a radical R, afforded particularly effective conduction of hydroxyl ions through the membrane 8. In the compound $SO_2NRQ^+$ associated with the fluoropolymer 9, the radical R may typically be selected from hydrogen, an alkyl of the $C_1$-$C_{20}$ group, a cyclic compound comprising the $Q^+$ group and between 2 and 20 carbon atoms, and a cyclic compound comprising the $Q^+$ group, between 2 and 20 carbon atoms, and up to 4 heteroatoms. Examples of $SO_2NRQ^+$ compounds suitable for the composite electrode of the disclosure can be obtained according to the methods described in WO 2012/098146.

As explained above, the deposition method disclosure allows obtaining a protective membrane 8 which adheres to the outer surface 25 of a porous structure 7 without having to penetrate the pores of the air electrode to ensure stable anchoring to the electrode. This surprising stability further enables oxygen to make maximum use of the volume of the porous structure for oxidation reactions. Indeed, the hydroxyl ions 4 can freely migrate through the membrane 8 as indicated by the path 40 in FIG. 3, to reach the pores between the grains 6 of the porous structure 7 where oxygen from the air is also located. The oxygen $O_2$ can also migrate freely in the pores of the air electrode as indicated by the path 20 in FIG. 3. The hydroxyl ions and oxygen can thus interact in a maximized number of reaction sites throughout the volume of the air electrode. The reaction volume available for oxidation reactions is not reduced by flooding phenomena, prevented by the presence of the impermeable membrane, or by the fluoropolymer 9 which does not fill the pores of the air electrode, even in the superficial areas of the latter.

In addition, the adhesion of the membrane 8 to the outer surface 25 of the porous structure 7 can be optimized when the fluoropolymer 9 comprises a backbone chain with at least one polar group and/or at least one group that is at least partially hydrogenated. Polar groups can interact with the carbon contained in an air electrode. Similarly, the presence of sulfur groups on the backbone chain of the fluoropolymer 9 may also contribute to an interaction with the air electrode in a way that facilitates organization of the fluoropolymer 9 into a layer on the outer surface 25 of a porous structure 7.

The membrane 8 comprising the fluoropolymer as a layer 9 has a higher resistance to alkaline electrolytes with high hydroxyl ion concentrations than membranes based on interpenetrating polymer or semi-interpenetrating polymer networks such as those described in document FR0953021. This improved resistance can be attributed to the addition of a backbone chain comprising the fluoropolymer, in the quaternary ammonium group. In addition, whereas quaternary ammonium groups are not known to be stable in strongly basic solutions, it has been found that by using a diamine containing no hydrogen in the beta position of the quaternary ammonium group, a particularly satisfactory stability and resistance can be obtained.

A non-limiting example of a fluoropolymer that can be used is described below. Such a polymer consists of a carbon backbone chain comprising groups associated thereto by covalent bonds. These groups themselves comprise terminals of the chemical formula $SO_2NRQ^+$ wherein Q, R are as defined above.

The fluorinated backbone may be an arbitrary linear polymer chain comprising, for example, repeating units of the chemical formula:

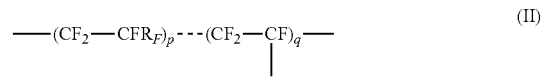

where $R_F$ is selected from F, Cl, or $-CF_3$, and is preferably selected as fluorine.

The element p of formula (II) above may be an integer between 0 and 16. The element q may be an integer between 1 and 10, and the ratio p'/q' may be between 0.5 and 16, p' denoting an average value of all values of p in the repeating units and q' denoting an average value of all values of q in the repeating units.

More particularly, the fluoropolymer may comprise repeating units of the chemical formula:

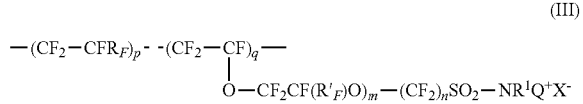

where the terminals of chemical formula $SO_2NRQ^+$ are covalently bonded to the backbone chain by groups of formula $[O—(CF_2CF(R_F)O)_m—(CF_2)_n]—$.

The element R'F in formula (III) above may be selected from F, Cl, or $—CF_3$, and is preferably selected as being fluorine or $—CF_3$. The element m may be an integer equal to 0 or 1, n may be an integer between 0 and 10, $R^1$ is as R defined above, Q+ is as defined above, and $X^−$ may be a anion selected from the group consisting of organic anions and lipophilic inorganic anions. When m is 1, n is an integer between 0 and 10, preferably between 0 and 6. Preferably, when m is 1, n is 2. When m is 0, n is an integer between 0 and 10, preferably between 2 and 6, more particularly between 2 and 4. Preferably, when m is 0, n is 2.

The fluoropolymer may be prepared by means of a method comprising:

reacting a fluoropolymer comprising moieties having sulfonyl fluoride terminals with an amine, to obtain sulfonamide terminal groups.

This reaction is followed by reacting the product of the previous reaction with an alkylating agent to form an ion-exchanging quaternary ammonium group.

The amine can be written in the generic formula $HNR^1Q^1$ where $R^1$ is as R defined above, and $Q^1$ is a group comprising a precursor of the tertiary amino group of the quaternary ammonium group $Q^+$.

Copolymers comprising repeating units derived from fluoroolefin of the chemical formula $CF_2=CFR_F$, where $R_F$ is selected from F, Cl, and $—CF_3$, as well as copolymers comprising repeating units derived from at least one functional monomer of chemical formula $CF_2=CF—O—(CF_2CF(R'_F)O)_m—(CF_2)_nSO_2F$, where m is an integer equal to 0 or 1, n is an integer between 0 and 10, are compounds suitable for preparation of the fluoropolymer. The fluoroolefin is preferably tetrafluoroethylene.

The group ensuring ion conduction in the polymer may have the chemical formula:

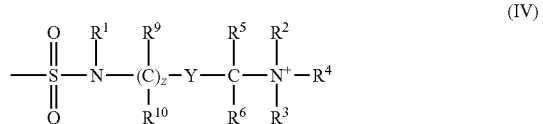

where Y is a $C_6$-$C_{10}$ aryl group, a heteroaryl group, or $CR^7R^8$ where $R^7$ is hydrogen, a halogen atom, or a $C_1$-$C_{20}$ alkyl group, or forms a closed chain with $R^2$, $R^5$, or R.

$R^8$ is hydrogen, a halogen atom, or a $C_1$-$C_{20}$ alkyl group, or forms a closed chain with $R^3$, $R^6$, or $R^7$. Each chain formed by $R^7$ or $R^8$ contains from 2 to 10 carbon atoms and optionally 1 to 4 heteroatoms, and the heteroaryl group comprises from 5 to 10 atoms in the closed chain.

$R^1$ is hydrogen, a $C_1$-$C_{20}$ alkyl group, or forms a closed chain $R^2$ or $R^5$, the closed chain comprising between 2 and 10 carbon atoms and between 1 and 4 heteroatoms.

$R^2$ is a $C_1$-$C_{20}$ alkyl group or forms a closed chain with $R^1$, $R^3$, $R^5$, $R^7$, or $R^9$, the closed chain containing between 2 and 10 carbon atoms and between 1 and 4 heteroatoms such as nitrogen atoms.

$R^3$ is a $C_1$-$C_{20}$ alkyl group or forms a closed chain with $R^2$, $R^6$, $R^8$, or $R^{10}$, the closed chain containing 2 to 10 carbon atoms and 1 to 4 heteroatoms.

$R^4$ is a $C_1$-$C_{20}$ alkyl group.

$R^5$ is hydrogen, a halogen atom, or a $C_1$-$C_{20}$ alkyl group, or form a closed chain with $R^1$, $R^2$, $R^7$, or $R^9$, the closed chain containing 2 to 10 carbon atoms and optionally 1 to 4 heteroatoms.

$R^6$ is hydrogen, a halogen atom, or a $C_1$-$C_{20}$ alkyl group, or form a closed chain with $R^3$, $R^8$, or $R^{10}$, the closed chain containing 2 to 10 carbon atoms and optionally 1 to 4 heteroatoms.

Each $R^9$ may be hydrogen, a halogen atom, a $C_1$-$C_{20}$ alkyl group, or a closed chain with $R^2$ or $R^5$, the closed chain containing 2 to 10 carbon atoms and optionally 1 to 4 heteroatoms.

Each $R^{10}$ may be hydrogen, a halogen atom, or a $C_1$-$C_{20}$ alkyl group, or form a closed chain with $R^3$ or $R^6$, the closed chain containing 2 to 10 carbon atoms and optionally 1-4 heteroatoms.

Z is an integer between 0 and 4, and the closed chain structures in the group of chemical formula (IV) illustrated above may be linked by bridges based on a $C_1$-$C_4$ alkyl group.

Among the amines suitable for preparation of the fluoropolymer, are compounds having the chemical formula:

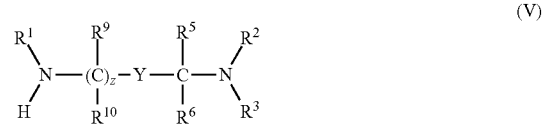

where $R^1$, $R^2$, $R^3$, $R^5$, $R^6$, $R^9$, $R^{10}$, Y and z are as defined above.

Examples of amines according to chemical formula (V) may be taken from the following families of compounds:
α-(dimethylamino)-β,β-dialkyl-ω-aminoalkyls, for example N,N,2,2-tetramethyl-1,3-propanediamine;
N-(ω-aminoalkyl) imidazoles;
2-alkyl-4-ω-aminoalkyl-N,N-dimethylaminobenzyls and 2,6-dialkyl-4-amino-N,N-dimethylaminobenzyls, for example 2,6-dimethyl-4-amino-N,N-dimethylbenzylamine;
1-methylpiperazines, mono- and/or disubstituted for alkyl groups in position 2 and/or 6, for example 1,2,6-trimethylpiperazine;
1-(ω-aminoalkyl)piperazines, mono- and/or disubstituted for alkyl groups in position 2 and/or 6;
"bridged aminopiperazine";
1-methyl-4(ω-aminoalkyl)-3,5-alkyl (mono, di) piperidines;
1-methyl (or H)-2,6 alkyl (mono, di, tri or tetra)-4-aminopiperidines;
"bridged aminopiperidine";
1-methyl-3-aminopyrrolidines, optionally with alkyl substituted in position 2- and/or 5-, for example 3-amino-1-methylpyrrolidine;
4-(ω-aminoalkyl)morpholine, with alkyl substituted in position 3 and/or 5, for example 4-(2-aminoethyl) 2,6 dimethyl morpholine;
"aza-aminoadamantanes".

Preferably, the amine is N,N,2,2-tetramethyl-1,3-propanediamine. Thus, in formula (V), $R^1$=H, $R^2$=$R^3$=$CH_3$, $R^5$=$R^6$=$R^9$=$R^{10}$=H, z=1 and Y=$CR^8R^9$, with $R^8$=$R^9$=$CH_3$.

The fluoropolymer of the membrane 8 of the composite electrode 1 also provides stability and resistance to the corrosive effect of the hydrogen peroxide present in a liquid electrolyte 3 of basic pH. It seems that resistance to the liquid electrolyte of basic pH is associated with resistance to hydrogen peroxide, particularly when hydrogen peroxide is present at a 5% mass concentration.

Figure 4:
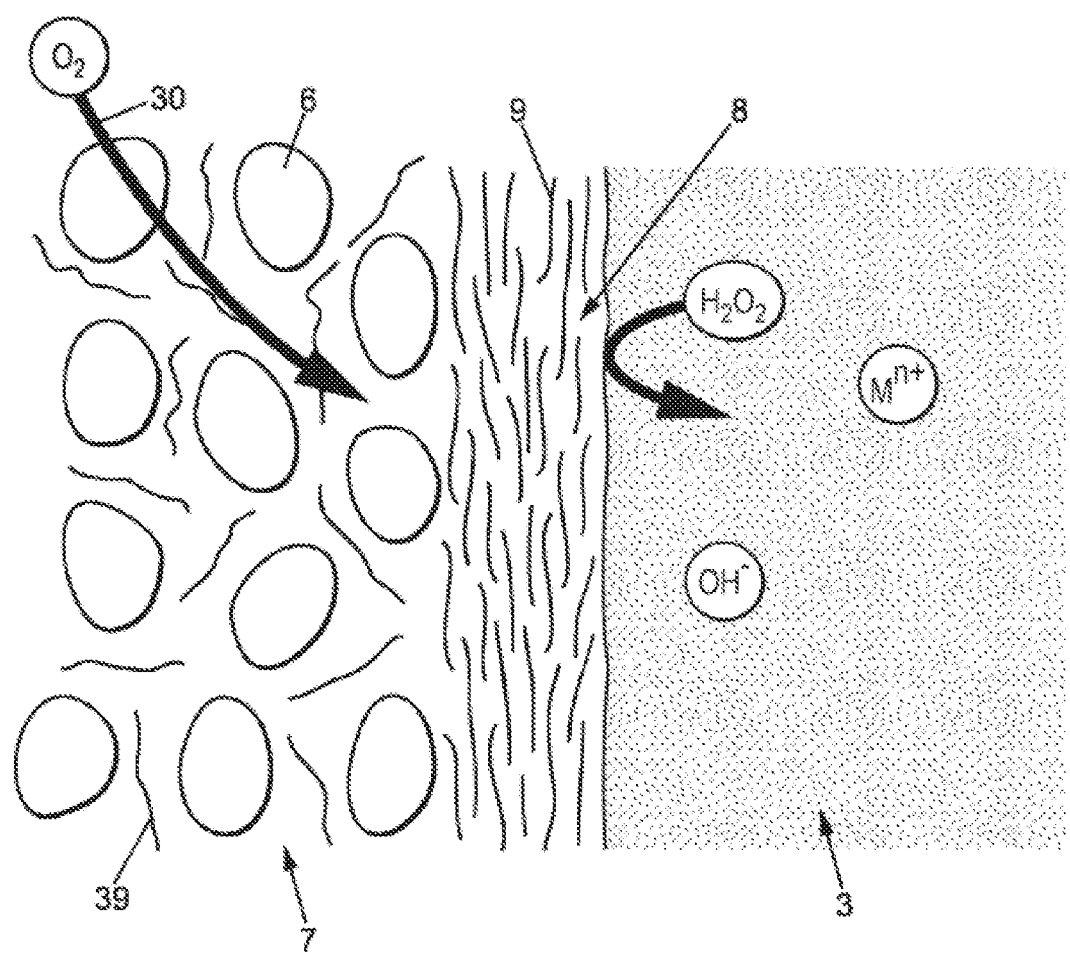
FIG. 4 is a schematic representation of a composite electrode according to a second embodiment, in discharge phase.

Conduction of hydroxyl ions through the membrane 8 can be supplemented by better conduction of hydroxyl ions in the porous structure 7 by incorporating an anion-conducting fluoropolymer in the structure of the air electrode at the time of manufacture. Advantageously, the fluoropolymer used in the air electrode is the same as the one present in the membrane 8. FIG. 4 illustrates a portion of a composite electrode according to this second embodiment, where the porous structure 7 further comprises molecules 39 of a fluoropolymer 9, in order to improve the conduction of hydroxyl ions in the volume of the air electrode and render the porous structure 7 even more impermeable to any basic liquid electrolyte in contact with said porous structure.

The molecules 39 of fluoropolymer are an integral part of the porous structure 7. They may, for example, be incorporated into the air electrode at the time of manufacture. The porous structure 7 is typically obtained from a carbon powder comprising grains 6 which are joined by a binder during a step which may be a sintering step, for example. The fluoropolymer 9, in polymerized form and suspended in the first liquid solution, can be mixed with the carbon powder during manufacture of the air electrode to ensure uniform distribution of the molecules 39 in the structure of the air electrode, as is schematically represented in FIG. 4. Then a fluoropolymer 9 is deposited as a layer on this air electrode as described above.

Furthermore, although this additional step is not represented, it is possible to further increase the ion conduction properties of the porous structure 7, in both embodiments represented in FIGS. 3 and 4. In particular, before application of the first liquid solution to form the membrane 8, it is possible to provide a step of applying a second liquid solution comprising an interpenetrating polymer or semi-interpenetrating polymer network. For example, the IPN or semi-IPN networks described in document FR0953021 can be deposited on the porous structure before formation of the membrane 8. This second liquid solution and the IPN and semi-IPN networks are provided to penetrate the porous structure. Once inside the air electrode, an evaporation step is carried out in order to evaporate the solvent of the second liquid solution and allow effective in-situ polymerization of the IPN or semi-IPN network in the porous structure 7. This IPN or semi-IPN network, integrated with the porous structure 7, allows better conduction of hydroxyl ions in the air electrode so as to deliver these ions throughout the volume of the porous structure.

It has been observed that a composite electrode 1 as described above has a service life about seven times greater than an air electrode according to the prior art, and in particular the air electrodes of a zinc-air battery using ambient air from which $CO_2$ has not been filtered. In addition, the composite electrodes are resistant to the electrolytes of high alkalinity having hydroxyl ions in concentrations of about 8 mol/L or more encountered in metal-air batteries, particularly zinc-air batteries.

Figure 5:
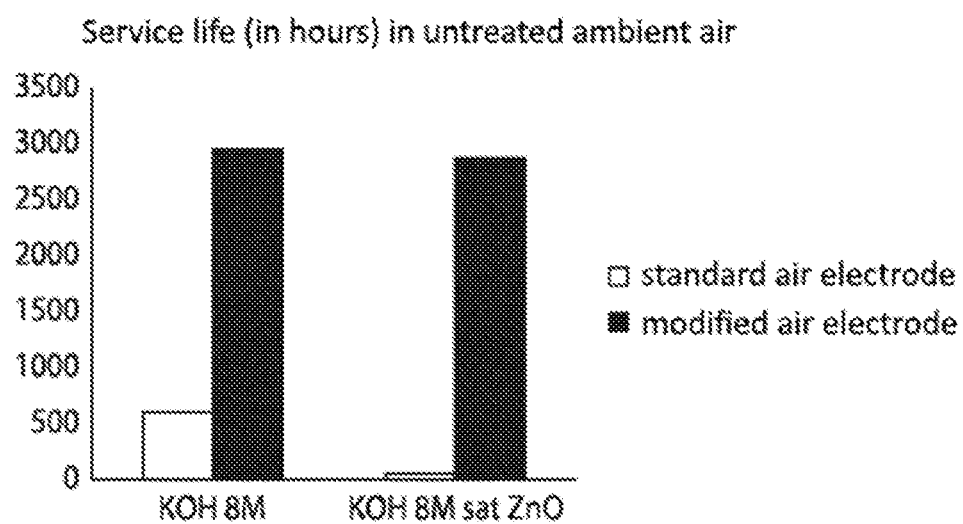
FIG. 5 is a graph comparing the service life in hours with untreated ambient air, of a standard air electrode of the prior art, to that of a composite air electrode according to an embodiment, in two solutions of high hydroxyl ion concentrations.

FIG. 5 shows a graph of the results of an experiment comparing the longevity of an air electrode according to the disclosure to the longevity of an air electrode according to the prior art.

The end of service life of electrodes of a battery is characterized by a loss of impermeability of the electrode to the electrolyte, which is indicated by the passage of liquid electrolyte through the electrode.

On an air electrode operating at a constant current density of 30 $mA/cm^2$ with untreated ambient air in a liquid electrolyte composed of an aqueous solution of KOH at a concentration of 8 mol, we observe a loss of impermeability after 600 h of operation, as indicated by the white rectangle to the left side of FIG. 5. The same electrode covered with the polymer of the disclosure loses its impermeability after 3000 h under the same test conditions, as indicated by the black rectangle to the left side of FIG. 5.

The difference between the two types of electrodes is even more pronounced in the right side of the graph of FIG. 5. The results to the right side of the graph represent the service life in hours of electrodes immersed in an electrolyte composed of an aqueous solution of KOH at a hydroxyl ion concentration of 8 mol/L saturated in ZnO. Under the same test conditions as those described above (under untreated ambient air at 30 $mA/cm^2$), the standard electrode without polymer remains impermeable for only 50 h, while an electrode according to the disclosure comprising a fluoropolymer as described above on its outer surface remains impermeable for 2900 h.

An example of creating the fluoropolymer 9 described above will now be presented. This example is given for illustrative purposes. Alternative embodiments which maintain the beneficial properties described above can be implemented without difficulty. Additional elements may be used as inspired by the manufacturing techniques described in WO 2012/098146.

Examples of Creating a Fluoropolymer

Synthesis of a polymer conductive to hydroxyl ions and impermeable to a liquid electrolyte of basic pH may in particular comprise the use of the following elements:
 a precursor of perfluorosulfonic acid (PFSA) of the brand Aquivion® PFSA, comprising —$SO_2F$ groups. The precursor is typically in the form of powder dried in a vacuum oven at 70° C. for 12 h,
 a hydrofluoroether dried over molecular sieves having a pore size of 3 Angstrom,
 N,N,2,2-tetramethyl-1,3-propanediamine,
 ethanol, methanol, isopropanol, acetonitrile,
 methyl iodide
 sodium tosylate
 sodium chloride.

In a first step, the compounds undergo an amidation reaction.

61 grams of Aquivion® PFSA precursor are placed in a flask containing 350 g hydrofluoroether. The flask is equipped with a stirrer, a dropping funnel, a nitrogen gas inlet, and a gas outlet. A stream of nitrogen is maintained throughout the process at a flow rate of about 1 liter per hour in order to keep the mixture anhydrous. The polymer suspension is stirred at room temperature for about 2 hours. The flask is then cooled to −20° C. using an external cold source and, while stirring the mixture, 60 grams of N,N,2,2-tetramethyl-1,3-propanediamine are slowly added for about 20 minutes through the dropping funnel. The mixture is stirred at a temperature of −20° C. for an additional 6 hours. The polymer is then filtered, washed with 150 grams hydrofluoroether for one hour while stirring, and then treated twice with 200 grams of methanol for 1 hour while stirring. The whole is then treated twice with 200 grams of a solution comprising 5% KOH by mass while stirring for one hour. The polymer is then dried in a vacuum oven at 70° C. for 4 hours. 73 grams of dried polymer are thus obtained. Quantitation of the polymer indicates a concentration of 2.0 meq/g.

Analysis of the obtained polymer compound confirms the presence of a partially fluorinated backbone chain comprising tetrafluoroethylene derivatives and sulfur compounds derived from $CF_2=CFOCF_2CF_2-SO_2F$, in other words perfluoro-5-sulfonylfluoride-3-oxa-pentene. The formula shown below illustrates a chemical composition of the resulting fluoropolymer. The term Rf indicates the partially fluorinated backbone chain of Aquivion® PFSA.

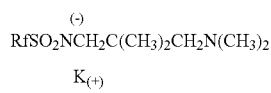

Next, the resulting polymer undergoes an alkylation reaction according to the example presented below.

70 grams of a polymer prepared according to the previous example and 350 grams of anhydrous acetonitrile are placed in a flask equipped with a stirrer, a dropping funnel, a condenser, and an inlet and outlet for nitrogen gas. A stream of nitrogen is maintained throughout the process at a flow rate of about 1 liter/hour, in order to keep the mixture anhydrous. The flask is heated to 65° C. by an external heat source and the polymer suspension is stirred for 1 hour. Next, 80 grams of methyl iodide are added through the funnel and the mixture is stirred for 12 hours at 65° C. After cooling the mixture to room temperature, the polymer is filtered, washed with 250 ml acetonitrile for one hour while stirring, then washed three times with 250 ml methanol for 1 hour while stirring. The polymer is then dried in a vacuum oven at 70° C. for 4 hours. 73 grams of dried polymer are thus obtained.

Quantitation of the polymer indicates an iodide concentration of 0.85 meq/g.

The structure of the polymer obtained at the conclusion of this preparation step is according to the formula shown below:

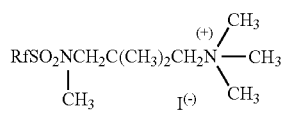

The term Rf refers to the partially fluorinated backbone chain of Aquivion® PFSA, described above.

Finally, the mixture undergoes an anion exchange reaction (iodide replaced with tosylate).

72 grams of quaternary ammonium iodide prepared according to the protocol described above are stirred for 8 hours at 60° C. in an aqueous-alcohol mixture of salt of methyl tosylate sodium (30 grams), ethanol (300 grams), and water (300 grams). This operation is repeated twice. An argentometric assay carried out on 71 grams of polymer obtained after filtering and washing shows that the compound does not have any residual iodide.

A first liquid solution of the fluoropolymer can then be obtained using the protocol described below.

51 grams of the polymer obtained in the step described above are placed in a flask containing 200 grams N,N-dimethylacetamide and exposed to a temperature of 80° C. for 8 hours while stirring vigorously. After a sonication step, the liquid composition is placed in a centrifuge to rotate at 3000 rpm for 15 minutes. This causes a small amount of a transparent gel-like composition to appear at the bottom of the flask. This polymer compound represents a 19% polymer concentration by mass relative to the solvent.

This example describes how to obtain the first liquid solution used to manufacture a membrane 8 of the disclosure. However, similar results can be obtained using other chemical compositions possessing the chemical properties described above to ensure both a good conduction of hydroxyl ions and an impermeability to a basic liquid electrolyte. The impermeability and conduction properties of a membrane obtained from the compound synthesized according to the example described above have been characterized in different basic solutions. In particular, a membrane 50 µm thick was prepared from the first liquid solution on a support specially provided for experimental purposes.

The membrane was treated with a KOH solution at a concentration of 1 mol/L, in a water ethanol mixture having a 1:1 mass ratio. The membrane is then washed with water and placed in a flask containing a mixture as shown in the figure below, for the durations and at the temperatures indicated in the table below. At the end of each test, the membrane is placed for 24 hours in a solution containing 100 grams of sodium chloride at a concentration of 0.6 mol/L in a water-ethanol mixture having a 1:1 mass ratio, then washed with water. The chloride content is measured and indicated in the table below. The ion content of an untreated membrane, serving as a control sample, is 0.8 meq/g.

TABLE 1 conduction and stability tests of a fluoropolymer-based membrane

| solution | Temperature (° C.) | Duration (days) | Ion content (meq/g) |
|---|---|---|---|
| water | 25 | 15 | 0.75 |
| water | 80 | 8 | 0.75 |
| KOH 10 mol/L | 25 | 30 | 0.72 |
| KOH 8 mol/L | 25 | 15 | 0.70 |
| KOH 8 mol/L + $H_2O_2$ 5% | 25 | 15 | 0.72 |
| LiOH 4 mol/L | 25 | 15 | 0.75 |
| LiOH 8 mol/L + $H_2O_2$ 5% | 25 | 15 | 0.70 |
| KOH 8 mol/L | 45 | 15 | 0.70 |
| LiOH 4 mol/L | 60 | 15 | 0.72 |
| NaOH 2 mol/L | 80 | 8 | 0.75 |

The ion contents indicated in this table reflect a stability in the impermeability and conduction properties of the prepared membrane over time, and good resistance in the presence of a strongly alkaline liquid.

The present disclosure may find applications in all metal-air batteries using a porous air electrode as a positive electrode, and is of particular interest for protecting an air electrode in a zinc-air battery, offering good electrical performance with the general use of liquid electrolytes with a high concentration of hydroxyl ions.

The invention claimed is:

1. A method for manufacturing a composite electrode configured to be used in a metal-air electrochemical cell with a liquid electrolyte of basic pH, the method comprising:
    obtaining an air electrode porous structure comprising an outer surface, the porous structure being configured to facilitate an oxygen reduction reaction into hydroxyl ions in the presence of an electric current;
    synthesizing a first liquid solution comprising a fluoropolymer suspended in a solvent, the fluoropolymer being capable of forming a membrane impermeable to at least the liquid electrolyte of basic pH, the fluoropolymer comprising SO$_2$N groups capable of conducting hydroxyl ions and wherein the fluoropolymer comprises a fluorinated backbone chain with polar groups that are at least partially hydrogenated;

applying the first liquid solution at least once onto the outer surface of the porous structure, the solvent flowing through the porous structure and the fluoropolymer being deposited by aggregating into a layer on the outer surface of the porous structure, thereby forming said membrane impermeable to at least the liquid electrolyte of basic pH and conductive to hydroxyl ions.

2. The method according to claim 1, further comprising:
applying the first liquid solution a second time onto the outer surface of the porous structure,
evaporating the solvent of the first liquid solution applied a second time onto the outer surface of the porous structure.

3. The method according to claim 1, further comprising, during the obtaining of the porous structure:
incorporating the fluoropolymer comprising SO$_2$N groups capable of conducting hydroxyl ions and capable of forming a membrane impermeable to at least the liquid electrolyte of basic pH, into a carbon powder used to prepare the porous structure,
obtaining the porous structure from the carbon powder mixed with the fluoropolymer.

4. The method according to claim 1, wherein the electrode is configured as a positive electrode of a metal-air battery, the pH of the liquid electrolyte being about 14 or higher.

5. The method according to claim 1, wherein the membrane has a thickness from 10 μm to 100 μm after the applying step.

* * * * *